(12) United States Patent
Cripe

(10) Patent No.: US 9,124,181 B1
(45) Date of Patent: Sep. 1, 2015

(54) LOW SWITCH-STRESS SINGLE-ENDED PRIMARY-INDUCTOR CONVERTER

(75) Inventor: David W. Cripe, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 436 days.

(21) Appl. No.: 13/565,408

(22) Filed: Aug. 2, 2012

(51) Int. Cl.
*H02M 3/335* (2006.01)

(52) U.S. Cl.
CPC ...................... *H02M 3/335* (2013.01)

(58) Field of Classification Search
CPC ....................................................... H02M 3/335
USPC ............ 323/271, 282, 351; 363/21.02, 21.04, 363/21.06
See application file for complete search history.

(56) References Cited

U.S. PATENT DOCUMENTS

| 5,736,842 | A  | * | 4/1998 | Jovanovic | ...................... 323/222 |
| 7,193,396 | B2 | * | 3/2007 | Orr | ................................ 323/225 |
| 7,480,156 | B1 | * | 1/2009 | Wittenbreder, Jr. | ............. 363/20 |

\* cited by examiner

*Primary Examiner* — Jeffrey Sterrett
(74) *Attorney, Agent, or Firm* — Angel N. Gerdzhikov; Donna P. Suchy; Daniel M. Barbieri

(57) ABSTRACT

A single-ended primary-inductor converter (SEPIC) may include, but is not limited to: a first switch connected to a first circuit node; a first capacitor and a second switch connected in series between the first circuit node and a second circuit node; an inductor connected to the first circuit node and the second circuit node; at least one of a third switch and a passive diode rectifier connected between the second circuit node and a third circuit node; and at least one second capacitor and at least one load connected in parallel to the third circuit node.

17 Claims, 2 Drawing Sheets

LOW SWITCH-STRESS SINGLE-ENDED PRIMARY-INDUCTOR CONVERTER

SUMMARY

The present invention is directed to systems and methods for configuring an SEPIC power converter such that the power switches are voltage-clamped and are operated in a zero-voltage switching mode, thus minimizing thermal and voltage stress on the switches.

The disclosed SEPIC may lead to large improvements in size, weight, power and cost over current implementations by permitting operation of a switch-mode power converter at MHz+ frequencies while maintaining high efficiency. This allows for reduction in size of passive components within the switching power conversion circuitry as well as reduced thermal management considerations.

A single-ended primary-inductor converter (SEPIC) may include, but is not limited to: a first switch connected to a first circuit node; a first capacitor and a second switch connected in series between the first circuit node and a second circuit node; an inductor connected to the first circuit node and the second circuit node; at least one of a third switch and a passive diode rectifier connected between the second circuit node and a third circuit node; and at least one second capacitor and at least one load connected in parallel to the third circuit node

BRIEF DESCRIPTION OF FIGURES

The numerous objects and advantages of the present invention may be better understood by those skilled in the art by reference to the accompanying figures in which.

DETAILED DESCRIPTION

Figure 1:
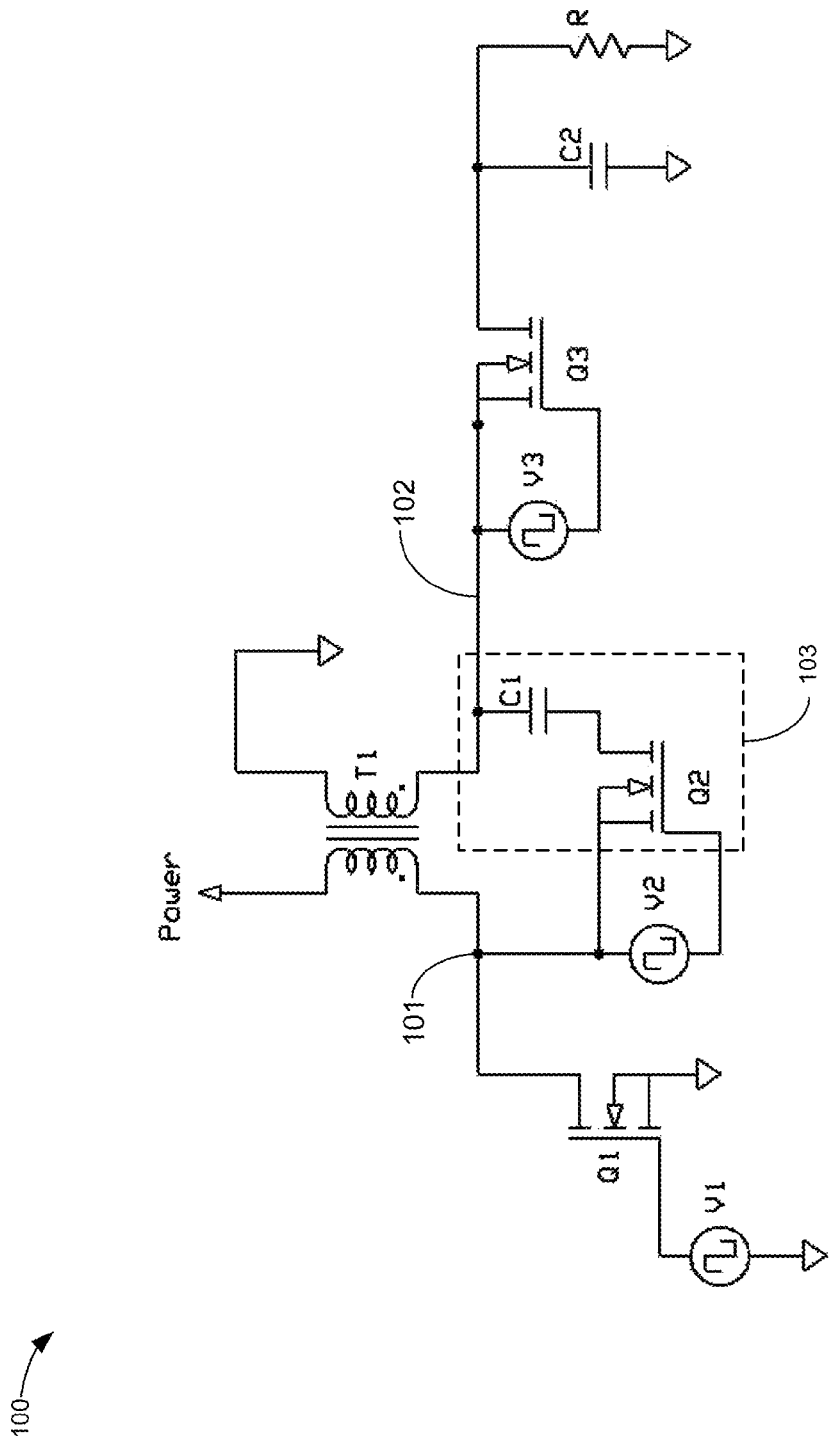
FIG. 1 illustrates a SEPIC.

Referring to FIG. 1, a single-ended primary-inductor converter (SEPIC) is shown. A SEPIC 100 is a type of DC-to-DC converter allowing the electrical potential (voltage) at its output to be greater than, less than, or equal to that at its input; the output of the SEPIC 100 is controlled by the duty cycle of a control transistor. A SEPIC 100 may have a non-inverted output (i.e. the output voltage is of the same polarity as the input voltage).

Figure 2:
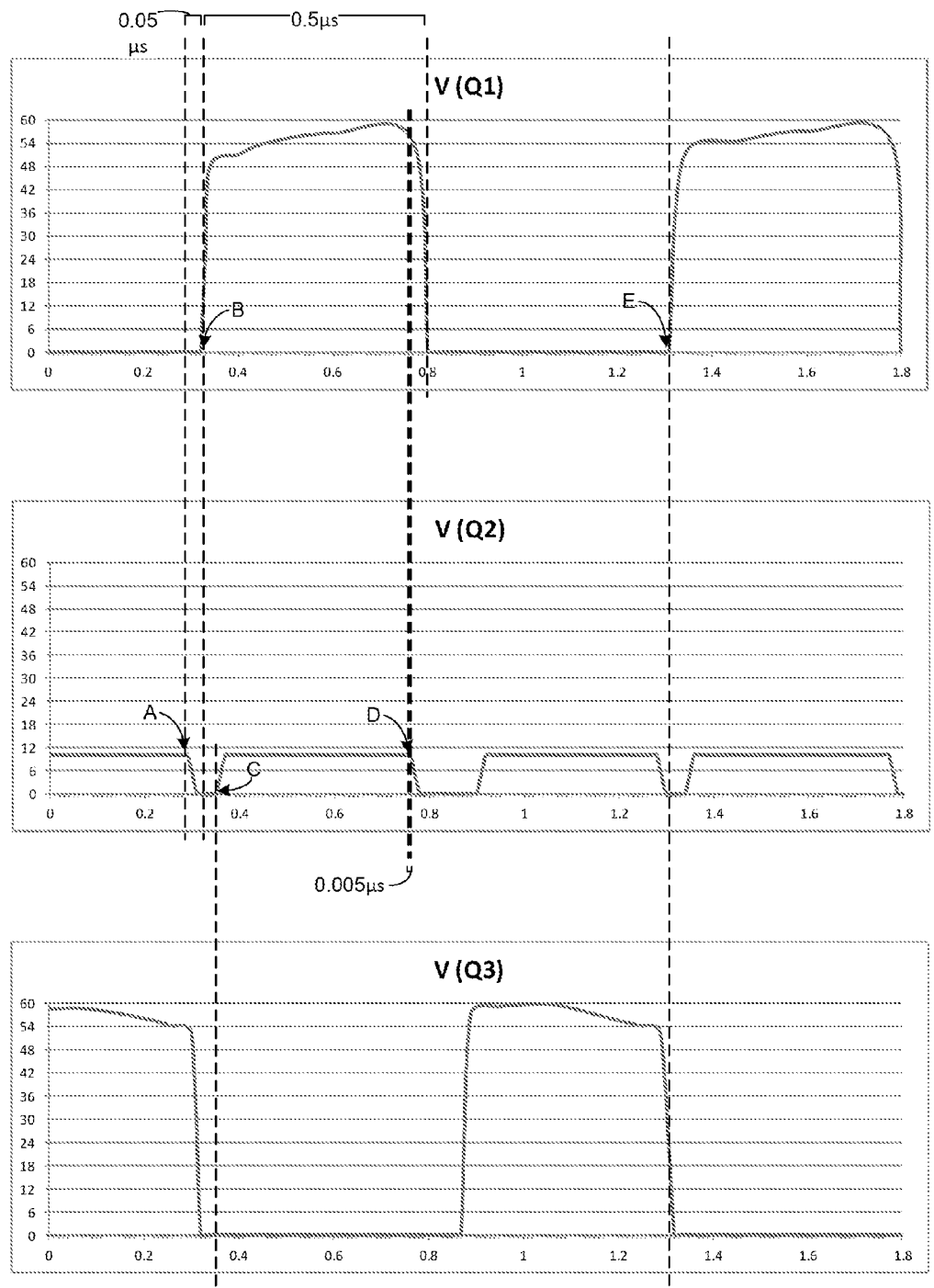
FIG. 2 illustrates a voltage timing diagram for a SEPIC.

The SEPIC 100 may include a voltage-controlled switch Q1 coupled to a circuit node 101. The switching of switch Q1 may be controlled by a square-wave voltage source V1 presenting a periodic square-wave voltage signal having a switch cycle period (e.g. a switch cycle period of approximately 0.50 µs as shown in FIG. 2). The SEPIC 100 may further include a capacitor C2 in parallel with a load R. The capacitor C2 and an arbitrary power load represented schematically as load R may be coupled to a circuit node 102 via a voltage-controlled switch Q3. The switching of switch Q3 may be controlled by a square-wave voltage source V3 presenting a square-wave voltage signal.

The SEPIC 100 may further include an inductor T1. The inductor T1 may be a leakage inductor having a first winding connected to the circuit node 101 and a second winding connected to the circuit node 102.

The illustrated SEPIC 100 may further include a voltage-controlled switch Q2 in series with a coupling capacitor C1. The switching of switch Q2 may be controlled by a square-wave voltage source V2 presenting a square-wave voltage signal. The switch Q2 and the coupling capacitor C1 may bridge circuit node 101 and circuit node 102.

Energy stored as leakage inductance of inductor T1 that, in a conventional SEPIC, may result in voltage spiking on switch Q1 and switch Q3 may, instead, be reduced through the use of the sub-circuit 103 including the coupling capacitor C1 and switch Q2.

During operation, the switch Q2 may be normally-on thereby permitting the leakage inductance of inductor T1 to resonate against the coupling capacitor C1. The switching timing of switch Q2 may be configured such that switch Q2 is switched off prior to switching on the switch Q1. For example, switch Q2 may be configured such that switch Q2 is switched on between about 5% and 15% or, more specifically, about 10% of the switch cycle period of switch Q1 prior to switching on the switch Q1. For example, FIG. 2, illustrates an exemplary voltage timing diagram associated with the relative switching states of switch Q1, switch Q2 and switch Q3. As shown, the switch Q1 may have a switch cycle period of approximately 0.50 µs. The switch Q2 may be switched off approximately 0.05 µs (i.e. 10% of the 0.50 µs switch cycle period of switch Q1) of the prior to switching on the switch Q2. As shown in FIG. 2, switch Q2 may be switched off at approximately 0.28 µs (i.e. point "A") prior to the switch Q1 being switched on at approximately 0.33 µs (i.e. point "B"). Referring again to FIG. 1, the energy stored as the leakage inductance of inductor T1 may resonate against the output capacitance ($C_{oss}$) of switch Q1 and switch Q2 thereby drawing the voltage of switch Q1 to zero prior to its being switched back on so as to reduce the switching stress on switch Q1.

Referring again to FIG. 2, the switch Q2 may be switched on again after switch Q3 begins conduction (e.g. at point "C" at approximately 0.36 µs as shown in FIG. 2). The switch Q2 may be switched off again between about 0.5% and 1.5% or, more specifically, about 1% of the switching cycle period of switch Q1 (e.g. 0.005 µs) before switch Q1 is switched off such as shown at point "D" at approximately 0.75 µs in FIG. 2. The switch Q1 may be switched on again when switch Q3 begins conduction as shown at point "E" at approximately 1.33 µs in FIG. 2.

The switch Q3 may be switched in a manner consistent with operation as a synchronous rectifier (i.e. after current flow commences through a metal-oxide semiconductor field-effect transistor (MOSFET) body diode of the switch Q3). The switch Q3 may be switched off after switch Q1 turns on and current flow through switch Q3 has just begun to reverse in order to improve the commutation of switch Q3. In another embodiment, the switch Q3 may be replaced with a passive diode rectifier.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

What is claimed is:

1. A single-ended primary-inductor converter (SEPIC) comprising:
    a first switch connected to a first circuit node;
    a first capacitor and a second switch connected in series between the first circuit node and a second circuit node;
    a leakage inductor connected to the first circuit node and the second circuit node;
        wherein the leakage inductor comprises a first winding connected to the first circuit node and a second winding connected to the second circuit node;
    at least one of a third switch or a passive diode rectifier connected between the second circuit node and a third circuit node; and
    at least one second capacitor and at least one load connected, in parallel, to the third circuit node.

2. The SEPIC of claim 1, wherein at least one of the first switch, the second switch or the third switch is a voltage controlled switch.

3. The SEPIC of claim 1, wherein switching timing of the first switch and the second switch is configured such that the second switch is switched off at a time prior to the first switch being turned on.

4. The SEPIC of claim 1, wherein the third switch is configured to be switched in a manner consistent with operation as a synchronous rectifier.

5. The SEPIC of claim 1, wherein the inductor is configured for resonating against at least one of the first switch and the second switch.

6. The SEPIC of claim 5, wherein the resonating against at least one of the first switch and the second switch is configured for limiting voltage spiking on at least one of the first switch and the second switch.

7. The SEPIC of claim 5, wherein the resonating against at least one of the first switch and the second switch is configured for substantially removing a voltage at the first switch.

8. The SEPIC of claim 1, wherein switching timing of the first switch and the second switch is configured such that the second switch is switched off at a time between about 0.1% and 15% of the switching cycle period of the first switch prior to the first switch being turned on.

9. The SEPIC of claim 8, wherein the switching timing of the first switch and the second switch is further configured such that the second switch is switched off at a time about 10% of the switching cycle period of the first switch prior to the first switch being turned on.

10. The SEPIC of claim 8, wherein the switching timing of the second switch and the third switch is configured such that the second switch is switched on at a time after the third switch begins conducting.

11. The SEPIC of claim 10, wherein the switching timing of the first switch and the second switch is further configured such that the second switch is switched off at a time between about 0.001% to 1.5% of the switching cycle period of the first switch prior to the first switch being turned off.

12. The SEPIC of claim 11, wherein the switching timing of the first switch and the second switch is further configured such that the second switch is switched off at a time about 1.0% of the switching cycle period of the first switch prior to the first switch being turned off.

13. A method for controlling a single-ended primary-inductor converter (SEPIC) comprising:
    switching a second switch of the SEPIC off at a time prior to a first switch of the SEPIC being turned on;
    switching the second switch of the SEPIC on at a time after a third switch of the SEPIC begins conducting; and switching the second switch of the SEPIC off at a time prior to the first switch of the SEPIC being turned off;
configuring a leakage inductor of the SEPIC to resonate against the first switch of the SEPIC and the second switch of the SEPIC;
wherein the leakage inductor comprises a first winding connected to a first circuit node and a second winding connected to a second circuit node.

14. The method of claim 13, wherein the switching the second switch of the SEPIC off at a time prior to the first switch of the SEPIC being turned off comprises:
switching the second switch of the SEPIC off at a time about 1% of the switching cycle period of the first switch of the SEPIC prior to the first switch of the SEPIC being turned off.

15. The method of claim 13, wherein the switching the second switch of the SEPIC off at a time prior to the first switch of the SEPIC being turned off comprises:
switching the second switch of the SEPIC off at a time between about 0.001% to 1.5% of the switching cycle period of the first switch of the SEPIC prior to the first switch of the SEPIC being turned off.

16. The method of claim 13, wherein the switching a second switch of the SEPIC off at a time prior to a first switch of the SEPIC being turned on comprises:
switching the second switch of the SEPIC off at a time between about 0.1% and 15% of the switching cycle period of the first switch of the SEPIC prior to the first switch of the SEPIC being turned on.

17. The method of claim 13, wherein the switching a second switch of the SEPIC off at a time prior to a first switch of the SEPIC being turned on comprises:
switching the second switch of the SEPIC off at a time about 10% of the switching cycle period of the first switch of the SEPIC prior to the first switch of the SEPIC being turned on.

* * * * *